US006947622B2

(12) United States Patent
Wang et al.

(10) Patent No.: US 6,947,622 B2
(45) Date of Patent: Sep. 20, 2005

(54) WAFER LEVEL TESTING OF OPTICAL COMPONENTS

(75) Inventors: Liwei Wang, Arcadia, CA (US); Dazeng Feng, Arcadia, CA (US); Xiaoming Yin, Pasadena, CA (US); Trenton Gary Coroy, Rancho Cucamonga, CA (US)

(73) Assignee: Kotura, Inc., Monterey Park, CA (US)

( * ) Notice: Subject to any disclaimer, the term of this patent is extended or adjusted under 35 U.S.C. 154(b) by 116 days.

(21) Appl. No.: 10/186,187

(22) Filed: Jun. 27, 2002

(65) Prior Publication Data

US 2004/0001664 A1 Jan. 1, 2004

(51) Int. Cl.[7] .................................................. G02B 6/26
(52) U.S. Cl. ............................ 385/15; 372/50; 359/629
(58) Field of Search .......................................... 385/15

(56) References Cited

U.S. PATENT DOCUMENTS

| | | | |
|---|---|---|---|
| 4,165,496 A | | 8/1979 | Di Domenico, Jr. et al. |
| 4,558,920 A | | 12/1985 | Newton et al. |
| 4,836,645 A | | 6/1989 | Lefevre et al. |
| 4,857,973 A | | 8/1989 | Yang et al. |
| 4,912,523 A | | 3/1990 | Refi et al. |
| 4,995,689 A | | 2/1991 | Sarraf |
| 5,140,149 A | | 8/1992 | Sakata et al. |
| 5,182,787 A | | 1/1993 | Blonder et al. |
| 5,221,984 A | | 6/1993 | Furuyama et al. |
| 5,249,245 A | | 9/1993 | Lebby et al. |
| 5,263,111 A | | 11/1993 | Nurse et al. |
| 5,282,080 A | * | 1/1994 | Scifres et al. ................ 359/344 |
| 5,333,216 A | | 7/1994 | Sakata et al. |
| 5,347,601 A | | 9/1994 | Ade et al. |
| 5,391,869 A | | 2/1995 | Ade et al. |
| 5,435,734 A | | 7/1995 | Chow |
| 5,500,869 A | * | 3/1996 | Yoshida et al. ................ 372/50 |
| 5,511,142 A | | 4/1996 | Horie et al. |
| 5,517,589 A | | 5/1996 | Takeuchi |
| 5,600,741 A | | 2/1997 | Hauer et al. |
| 5,641,956 A | | 6/1997 | Vengsarkar et al. |
| 5,652,813 A | | 7/1997 | Wilson |
| 5,764,832 A | | 6/1998 | Tabuchi |
| 5,786,925 A | | 7/1998 | Goossen et al. |
| 5,835,458 A | | 11/1998 | Bischel et al. |
| 5,910,012 A | | 6/1999 | Takeuchi |
| 5,988,842 A | | 11/1999 | Johnsen et al. |

(Continued)

FOREIGN PATENT DOCUMENTS

JP         404358105 A     12/1992

OTHER PUBLICATIONS

Lin, et al., *Detector Array Packaging Technology for PLCs and its Application in WDM Subsystems*, 1999 IEEE, 65–68.

Van Der Linden, et al., *High–Density and Alignment–Tolerant Integration of Monitoring Photodetector Arrays onto Polymeric Guided–Wave Components*, IEEE Transactions on Advanced Packaging, vol. 22, No. 4, Nov. 1999, pp 534–540.

(Continued)

*Primary Examiner*—John R. Lee
*Assistant Examiner*—Philip Johnston
(74) *Attorney, Agent, or Firm*—Gavrilovich, Dodd & Lindsey, LLP

(57) ABSTRACT

An optical device having one or more optical components is disclosed. A waveguide extends from an optical component to a testing port configured to receive a light signal from a position over the optical device and to insert the light signal into the waveguide. In some instances, the testing port is configured to receive a light signal from the waveguide and to direct the light signal to a location over the optical device. The optical device can be positioned on a wafer before being separated from the wafer. The waveguide can extend from an optical component over the perimeter of the optical device such that the testing ports are located outside the perimeter of the optical device.

22 Claims, 8 Drawing Sheets

U.S. PATENT DOCUMENTS

| | | | |
|---|---|---|---|
| 6,005,995 | A | 12/1999 | Chen et al. |
| 6,027,255 | A | 2/2000 | Joo et al. |
| 6,081,639 | A | 6/2000 | Kagami et al. |
| 6,108,472 | A * | 8/2000 | Rickman et al. ............... 385/48 |
| 6,169,825 | B1 | 1/2001 | Morey et al. |
| 6,275,628 | B1 | 8/2001 | Jones et al. |
| 6,316,281 | B1 * | 11/2001 | Lee et al. .................... 438/31 |
| 6,393,172 | B1 | 5/2002 | Brinkman et al. |
| 6,393,183 | B1 | 5/2002 | Worley |
| 6,406,196 | B1 | 6/2002 | Uno et al. |
| 6,504,965 | B2 | 1/2003 | Paniccia et al. |
| 6,538,243 | B1 | 3/2003 | Bohn et al. |
| 6,567,585 | B2 | 5/2003 | Harris |
| 6,567,590 | B1 | 5/2003 | Okada et al. |
| 6,658,176 | B2 | 12/2003 | Amantea |
| 2002/0044741 | A1 | 4/2002 | Takeuchi et al. |
| 2002/0172448 | A1 * | 11/2002 | Paniccia et al. ............... 385/16 |

OTHER PUBLICATIONS

Koren, et al., *A 1.3–mm Wavelength Laser with an Integraed Output Power Monitor Using a Directional Coupler Optical Power Tap*, IEEE Photonics Technology Letters, vol. 8, No. 3, Mar. 1996, pp. 364–366/.

Ohyama, et al., *8–Channel x 2.5 Gbit/s Hybrid Integrted Multiwavelength Phtoreceiver Module with Arrayed-Waveguide Grating Demulitiplexer*, Electronics Letters, 25$^{th}$ Apr. 2002, vol. 38, No. 9, pp 419–422.

Pennings, et al., *Integrated–Optic ersus Microptic Devices for Fiber–Optic Telecommunication Systems: A Comparison*, IEEE journal of Selected Topics in Quantum Electronics, vol. 2, No. 2, Jun. 1996, pp. 151–164.

* cited by examiner

WAFER LEVEL TESTING OF OPTICAL COMPONENTS

RELATED APPLICATIONS

This application is related to U.S. patent application Ser. No. 10/161,208, filed on May 31, 2002, entitled "Waveguide Tap Monitor" and incorporated herein in its entirety. This application is also related to U.S. patent application Ser. No. 10/161,213, filed on May 31, 2002, entitled "Waveguide Tap Monitor" and incorporated herein in its entirety.

BACKGROUND

1. Field of the Invention

The invention relates to devices for optical networking. In particular, the invention relates to wafer level testing of optical devices.

2. Background of the Invention

Optical communications networks employ a variety of optical devices. These optical devices often include one or more optical components such as demultiplexers, filters, attenuators and modulators. The optical devices typically include waveguides for carrying light signals to and from the optical components. At least a portion of the waveguides end at a facet positioned at the side of the optical device. During operation of the optical device, the facets are each coupled with an optical fiber that carries the light signals to and/or from the optical device.

Fabricating the optical devices generally includes forming a plurality of optical devices on a single wafer and then separating the optical devices from unused portions of the wafer and from one another. After separating the optical devices, the waveguide facets are polished to reduce scattering and reflection associated with insertion of the light signals into the waveguides. The optical devices can then be independently tested. A portion of the optical devices often have an unacceptable performance level when the fabrication process is not properly tuned. There is a need to reduce the portion of the optical devices having unacceptable performance levels.

SUMMARY OF THE INVENTION

The invention relates to an optical device having one or more optical components. A waveguide extends from an optical component to a testing port configured to receive a light signal from a position over the optical device and to insert the light signal into the waveguide. In some instances, the testing port is configured to receive a light signal from the waveguide and to direct the light signal to a location over the optical device.

In some instances the optical device includes a plurality of waveguides that each extend from an optical component to a testing port. One or more testing ports can be configured to receive a light signal from a position over the wafer and insert the light signal into a waveguide and one or more testing ports can be configured to receive a light signal from a waveguide and direct the light signal to a location over the wafer.

In some instances, the optical device is positioned on a wafer before being separated from the wafer. At least a portion of the waveguides can extend from an optical component over the perimeter of an optical device such that the testing ports are located outside the perimeter of the optical device.

In one embodiment, the testing port includes a facet positioned on a waveguide and a reflecting surface. In some instances, the reflecting surface is positioned to receive a light signal from over the optical device and reflect the light signal toward the facet such that the light signal is transmitted through the facet. In some instances, the reflecting surface is positioned so as to receive a light signal transmitted through the facet and reflect the light signal to a location over the optical device.

The reflecting surface can be positioned at an angle φ measured relative to a base of the optical device. The angle φ can be less than 90°, 89°, 87° or 85° or in a range of 0° to 90°, 45° to 90°, 50° to 60° and 52° to 57°. The facet can be positioned at an angle θ measured relative to a base of the optical device. The angle θ can be less than 90°, 89°, 87° or 85° or in a range of 0° to 90°, 45° to 90°, 50° to 60° and 52° to 57°. The facet can also be positioned at an angle δ measured relative to a plane that is perpendicular to a base of the optical device and perpendicular to the longitudinal axis of the waveguide at the facet. The angle δ can be greater than 0°, 1°, 3° or 5° or in a range of 0° to 45°, 1° to 15°, 2° to 9° or 3° to 8°.

The invention also relates to a method of testing an optical device. The method includes inserting a light signal into a waveguide on the optical device from over the optical device. The light signal is inserted into the waveguide before the optical device is separated from a wafer. The method also includes extracting at least a portion of the light signal from a second waveguide on the optical device such that the light signal travels from the optical device to a location above the optical device.

The invention also relates to a method of operating an optical device. The method includes obtaining an optical device having a waveguide with a testing port. The testing port includes a reflecting surface and a facet positioned on the waveguide. The method also includes reflecting a light signal off the reflecting surface such that the light signal is transmitted through the facet.

Another embodiment of the method includes reflecting a light signal transmitted through the facet off the reflecting surface such that the light signal travels from the optical device to a location over the optical device.

DETAILED DESCRIPTION OF THE PREFERRED EMBODIMENT

Figure 1:
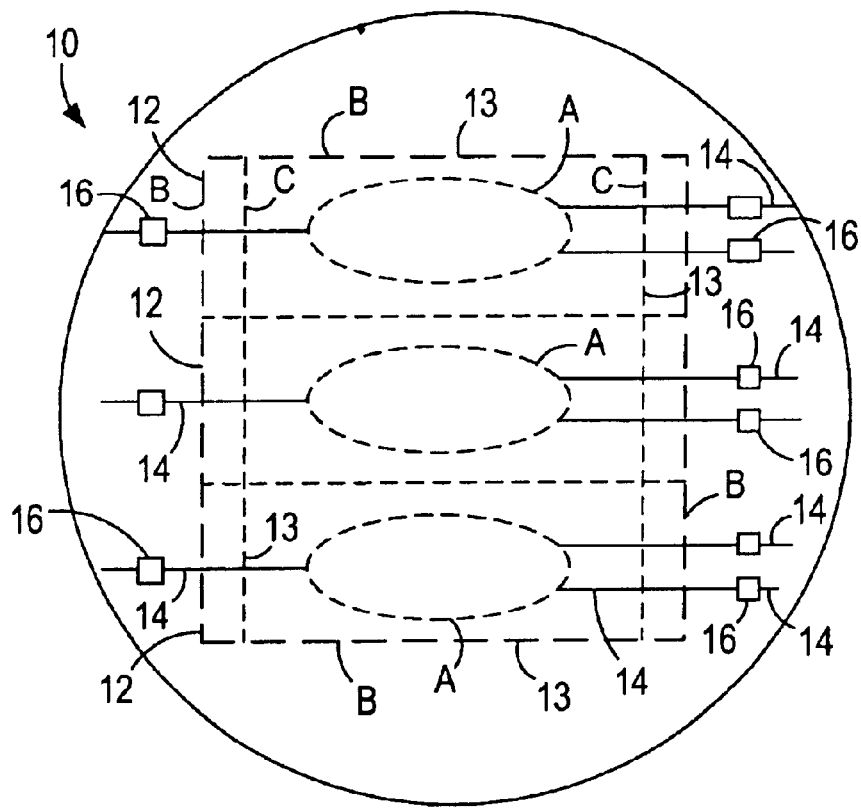
FIG. 1 is a topview a wafer on which a plurality of optical devices are formed.

The invention relates to an optical device having one or more optical components. A waveguide extends from an optical component to a testing port configured to receive a light signal from a position over the optical device and to insert the light signal into the waveguide. Accordingly, the testing port allows a light signal to be inserted into a waveguide from a position over the optical device. In some instances, the testing port is configured to receive a light signal from the waveguide and to direct the light signal to a location over the optical device. As a result, the testing port can allow a light signal to be directed from a waveguide to a location over the optical device.

The optical device can include one or more first testing ports configured to receive a light signal from a position over the optical device and to insert the light signal into a waveguide and one or more second testing ports configured to receive at least a portion of the light signal from a second waveguide and direct the light signal to a location over the optical device. The first and second testing ports can be employed to test the optical component. For instance, a first testing port can be employed to insert the light signal into a waveguide and a second testing port can be employed to extract the light signal from another waveguide. The loss in the intensity of the light signal between the first testing port and the second can be measured to measure the intensity loss associated with the optical device.

Optical devices are generally formed on a wafer and then separated from other optical devices on the wafer and from unused portions of the wafer. Because the testing ports allow a light signal to be inserted into the waveguides from over the optical device and then extracted from the waveguide to a location over the optical device, the optical device can be tested without accessing waveguide facets located on the sides of the optical device. Because there is no need to access the facets on the sides of the optical device, the optical device can be tested before being separated from the wafer. As a result, the testing ports can be employed to test the optical devices at different stages in the fabrication process. Testing the optical devices at different stages in the fabrication process can reveal a stage of the fabrication process that is a source of poor performance. The identified stage can then be fined tuned to improve the optical device performance and accordingly increase the yield of the fabrication process. Once the fabrication process is tuned, the testing ports can be employed to monitor continued process performance. Further, the testing ports can be employed to screen the optical devices before separating the optical devices. Considerable time and expense are associated with separating the optical devices from one another and from unused portions of the wafer. Time and expense are also associated with polishing of the facets. Testing the optical devices before separation can eliminate the need to separate and polish optical devices with unacceptable performance levels and can accordingly reduce the time and costs associated with separating and polishing the optical devices.

When the optical device is included in a wafer, waveguides associated with an optical device can each extend past the perimeter of an optical device to a testing port located outside the perimeter of the optical device. As a result, the testing port is removed when the optical device is separated from the wafer. Accordingly, the testing ports need not be evident in the final optical device.

FIG. 1 is a wafer 10 on which a plurality of optical devices 12 are formed. A suitable wafer 10 includes, but is not limited to, a silicon-on-insulator wafer. The dashed lines labeled A illustrate the general location of one or more optical components on each optical device 12. Suitable optical components for use with an optical device 12 include, but are not limited to, demultiplexers, multiplexers, filters, amplifiers, equalizers, add/drop nodes, interleavers, lasers, LEDs and optical attenuators.

The dashed lines labeled B illustrate the lines of separation for the optical devices 12. For instance, the illustrated optical devices 12 are separated from one another and from the unused portions of the wafers 10 along the dashed lines labeled B. Suitable methods for separating the optical devices 12 along the dashed lines labeled B include, but are not limited to, dicing, etching and cleaving.

The perimeter 13 of the optical device 12 is the perimeter of the optical device 12 after the optical device 12 has been separated and processed. In some instances, the line of separation serves as the perimeter 13 of the optical device 12. However, processing of the optical devices after separation can cause the perimeter 13 of the optical device 12 to be moved further onto the optical device. For instance, the facets of many optical devices 12 are polished after the optical devices 12 are separated. Polishing can remove a substantial portion of the wafer 10. As a result, all or a portion of the optical device perimeter 13 can be positioned within the lines of separation as illustrated by the dashed lines labeled C.

Each optical device 12 includes one or more waveguides 14 where light signals are constrained. The waveguides 14 on an optical device 12 are arranged so as to carry the light signals to and/or from the optical components on the optical device 12. The waveguides 14 can terminate within the perimeter 13 or can extend from the one or more optical components beyond the perimeter 13 as is illustrated. At least a portion of the waveguides 14 include a testing port 16. As will be described below, the testing ports 16 can be operated so as to test the optical components on the wafer 10.

The line of separation is located between the testing ports 16 and the one or more optical components. As a result, the testing ports 16 are separated from the optical devices 12 when the optical devices 12 are separated from the unused portions of the wafer 10 and/or from the other optical devices 12 on the wafer 10. The testing ports can also be located between the line of separation and the perimeter 13. When the testing ports are located between the line of separation and the perimeter 13 the testing port remains coupled with the optical device after separation. As a result, the optical devices can be tested after separation. The testing ports are removed during additional processing such as polishing.

Figure 2A:
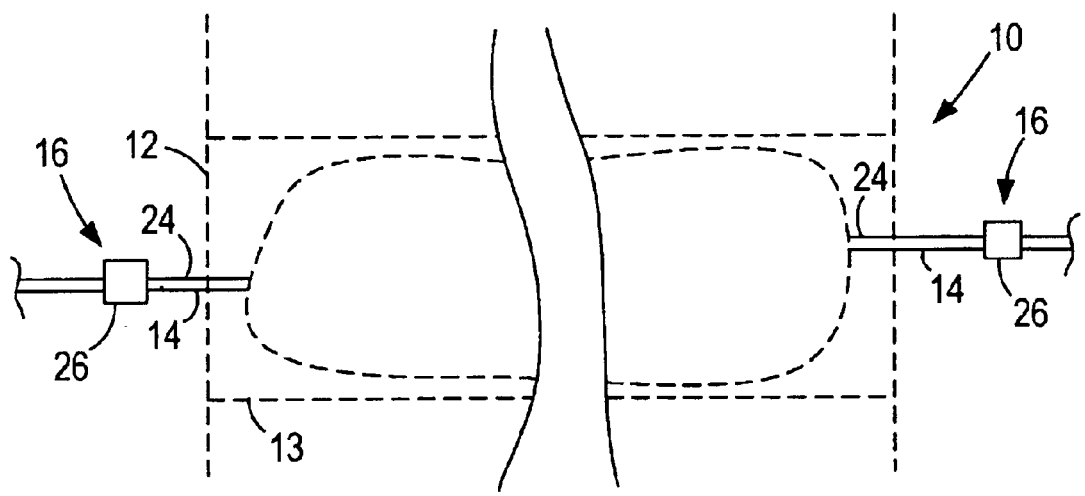
FIG. 2A is a topview of a portion of a wafer having an optical device with a plurality of waveguide. The waveguides include a testing port.
Figure 2B:
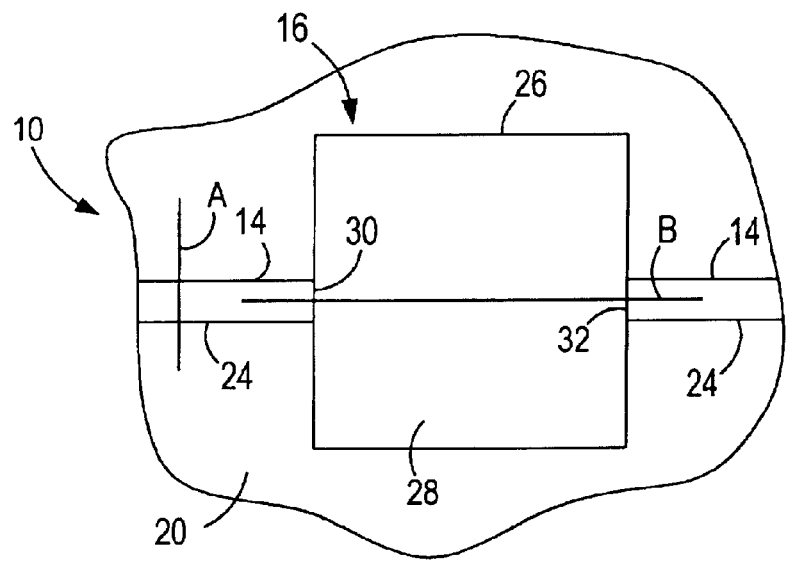
FIG. 2B is a topview of the portion of a waveguide having a testing port.
Figure 2C:
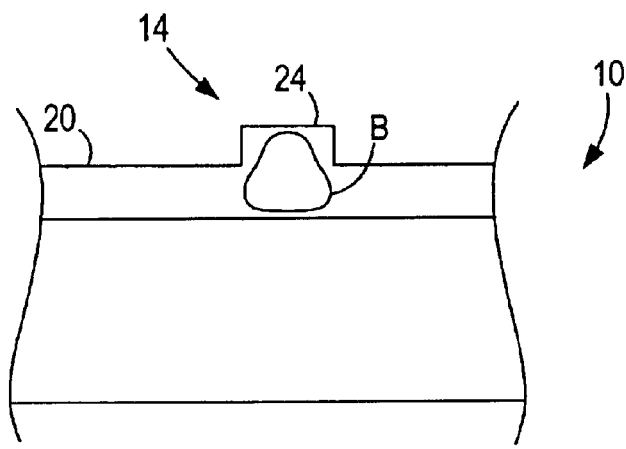
FIG. 2C is a cross section of the waveguide shown in FIG. 2B taken along the line labeled A.
Figure 2D:
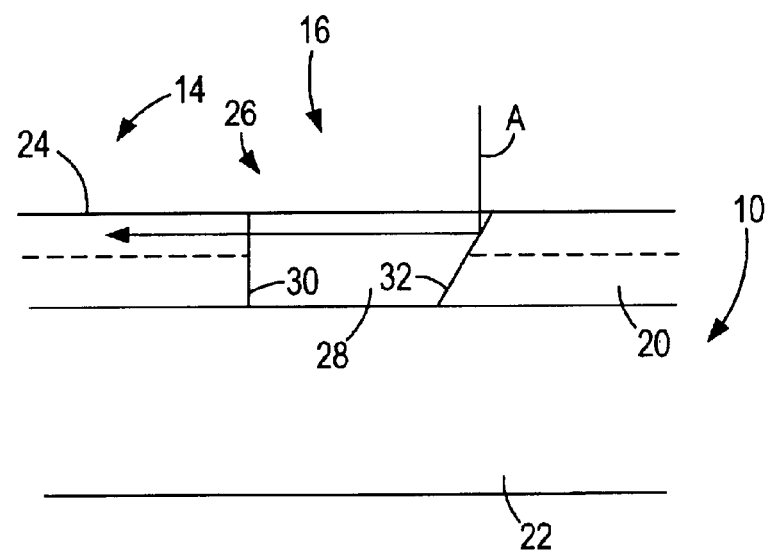
FIG. 2D is a cross section of the waveguide shown in FIG. 2B taken along the line labeled B. The testing port is illustrated as being operated so as to insert a light signal into the waveguide.

FIG. 2A through FIG. 2E illustrate the structure and operation of the testing ports 16. FIG. 2A is a topview of a portion of a wafer 10 having an optical device 12. One or more of the waveguides 14 associated with the optical device 12 includes a testing port 16. FIG. 2B is a topview of the portion of a waveguide 14 having a testing port 16. FIG. 2C is a cross section of the waveguide 14 shown in FIG. 2B taken along the line labeled A. FIG. 2D is a cross section of the waveguide 14 shown in FIG. 2B taken along the line labeled B.

The wafer 10 includes a light transmitting medium 20 positioned on a base 22. Although not illustrated, one or more cladding layers can be positioned over the light transmitting medium. Suitable light transmitting media 20 include, but are not limited to, silicon and silica. The light transmitting medium 20 is formed into a ridge 24 that defines a portion of the waveguide 14 where light signals are constrained. The location of the base of the ridge 24 in FIG. 2D is illustrated by the dashed line. The profile of a light signal being carried in the waveguide 14 is illustrated in FIG. 2C by the line labeled B. The portion of the base 22 adjacent to the light transmitting medium 20 is configured to reflect light signals from the waveguide 14 back into the waveguide 14. Accordingly, the portion of the base 22 adjacent to the light transmitting medium 20 restrains the light signals to the waveguide 14. Although not illustrated, a cladding can be positioned over all or a portion of the light transmitting medium 20.

The testing port 16 includes a recess 26 formed in the waveguide 14. A second light transmitting medium 28 is positioned in the recess 26. Suitable second light transmitting media 28 include, but are not limited to, epoxy, polymers and gasses such as air. An example of a suitable polymer is Polyimide PI2611 which does not create additional stress on an optical device 12 constructed on a silicon-on-insulator wafer.

The waveguide 14 includes a facet 30 positioned at the interface of the light transmitting medium 20 and the second light transmitting medium. The facet 30 defines at least a portion of one side of the recess 26. A reflecting surface 32 is positioned in the recess 26 so as to reflect receive a light signal transmitted through the facet 30. In the testing port 16 illustrated in FIG. 2D, the reflecting surface 32 is positioned on an opposite side of the recess 26 from the facet 30.

FIG. 2D illustrates the testing port 16 operated so as to insert a light signal into the waveguide 14 as illustrated by the arrow labeled A. The reflecting surface 32 is positioned such that a light signal originating from above the optical device 12 can be reflected off the reflecting surface 32 at an angle that causes the light signal to be incident on the facet 30. The light signal is transmitted through the facet 30 into the waveguide 14. The waveguide 14 carries the light signal to the one or more optical components on the optical device 12. Accordingly, the testing port 16 allows a light signal from above the optical device 12 to be inserted into a waveguide 14. As a result, the testing port 16 eliminates the need to separate the optical devices 12 and polish the waveguide 14 facets 30.

Figure 2E:
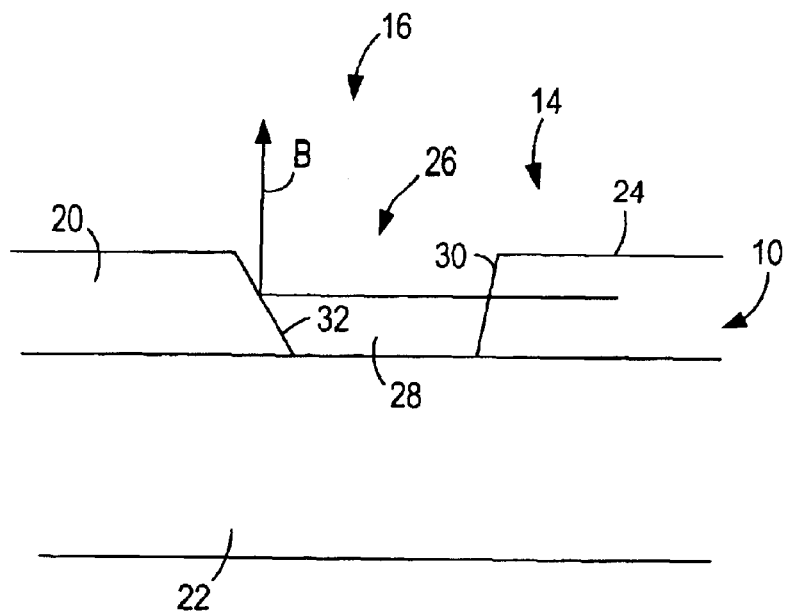
FIG. 2E is a cross section of the waveguide shown in FIG. 2B taken along the line labeled B. The testing port is illustrated as being operated so as to extract a light signal from the waveguide.

A testing port 16 can also be operated so as to extract a light signal from a waveguide 14 as illustrated in FIG. 2E. A light signal from the waveguide 14 is transmitted through the facet 30 as illustrated by the arrow labeled B. The reflecting surface 32 is positioned so as to receive the light signal transmitted through the facet 30 and to reflect the light signal out of the plane of the optical device 12. Accordingly, the testing port 16 allows a light signal to be extracted from a waveguide 14 without the need to separate the optical devices 12 and polish the waveguide 14 facets 30.

Figure 2F:
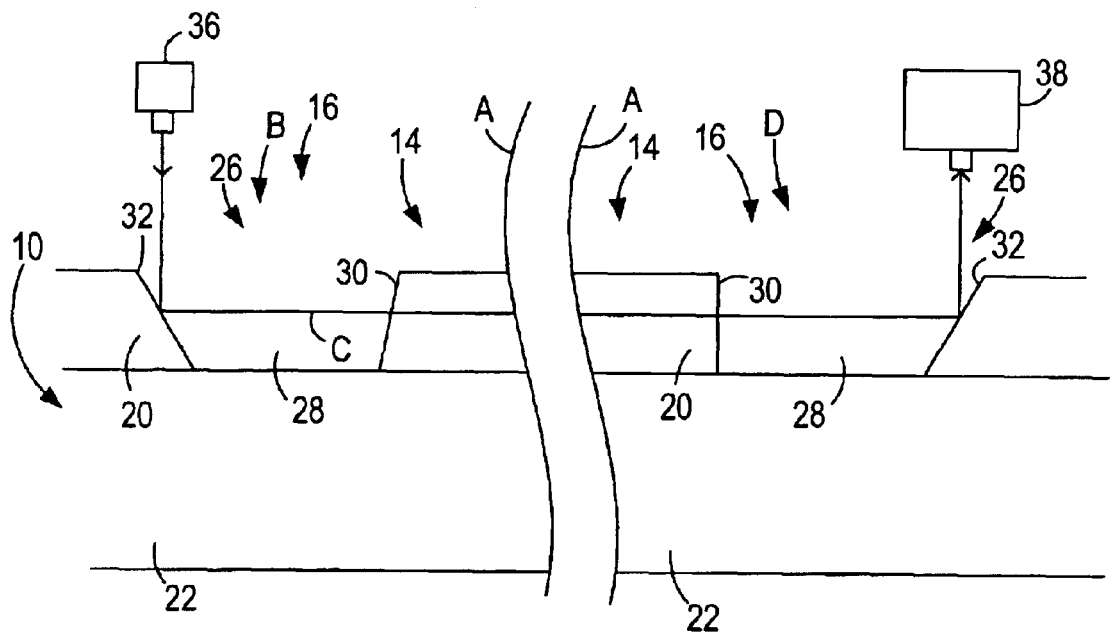
FIG. 2F is a cross section of a wafer that illustrates employment of the testing ports to test an optical device on a wafer.

FIG. 2F is a cross section of a wafer 10 that illustrates employment of the testing ports 16 to test an optical device 12 on a wafer 10. One or more optical components are located on the wafer 10 between the brackets labeled A. During testing of the optical device 12, a light signal is generated by a light source 36 such as a laser or an optical fiber. The testing port 16 labeled B is employed to insert the light signal into the optical device 12 as illustrated by the arrow labeled C. The light signal travels through the optical components to the testing port 16 labeled D. The testing port 16 labeled D is employed to extract the remaining light signal from the optical device 12. The extracted light signal is received by electronics 38 for testing the light signal. An example of a test that can be performed by the electronics 38 includes, but is not limited to, measuring the loss of intensity that occurs as the light signal travels through the optical device 12.

Figure 3A:
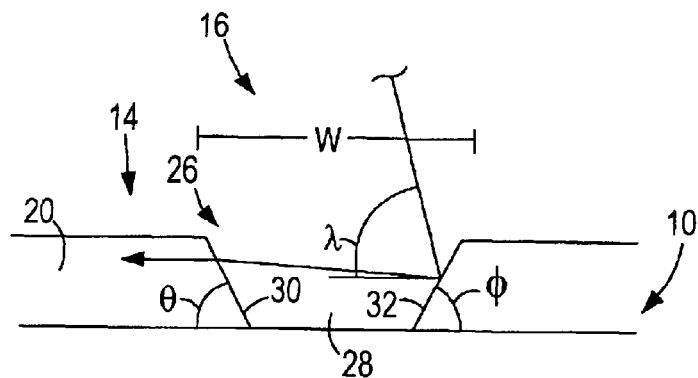
FIG. 3A illustrates the relationships between a facet and a reflecting surface of a testing port constructed to insert a light signal into a waveguide.

As shown in FIG. 3A, the facet 30 is positioned at an angle $\theta$ measured relative to the base 22 and the reflecting surface 32 is positioned at an angle $\phi$ measured relative to the base 22. The angle $\theta$ and the angle $\phi$ can be the same or can be different. A suitable range of angles for $\theta$ and/or $\gamma$ includes, but is not limited to, angles in the range from 0° to 90°, and 45° to 90° and angles less than 89°, 87° or 85°. In some instances, an angle of $\theta$ and/or $\gamma$ of 90° is suitable.

A variety of factors can influence the selected angle $\phi$. For instance, when a testing port 16 is operated so as to insert a light signal into a waveguide 14, the angle $\phi$ can be selected such that a light signal originating from above the optical device 12 can be reflected toward the facet 30. The light signal approaches the optical device 12 from an angle $\alpha$ measured relative to the base 22. Suitable angles $\alpha$ include, but are not limited to, angles greater than 15°, 30°, 45°, 60° or 75° and angles in the range of 10° to 170°, 30° to 150°, 65° to 115° or 70° to 80°. The angle $\phi$ can be selected so as to reflect the light signal toward the facet 30 for a particular angle $\alpha$.

For a particular angle $\alpha$, the angle $\phi$ can be selected such that the light signal reflected by the reflecting surface 32 is substantially parallel to the base 22. Alternatively, the angle $\phi$ can be selected such that the light signal reflected by the reflecting surface 32 has a particular angle of incidence on the facet 30. For instance, the degree of refraction that occurs when the light signal is transmitted through the facet 30 is a function of the angle of incidence. The angle $\phi$ can be selected to produce a degree of refraction that causes the light signal to travel along the waveguide 14 rather than being refracted out of the waveguide 14. For instance, the angle $\phi$ can be selected such that the light signal is refracted in a direction that is substantially parallel to the longitudinal axis of the waveguide 14 at the facet 30.

In some instances, an angle $\alpha$ approaching 90° is desired. When $\alpha$ approaches 90°, the width of the recess 26, W, can be reduced because the opportunity for interference between the light signal and the sides of the recess 26. The reduction in the width of the recess 26, W, results in a reduction in the amount of space occupied by the testing port 16 on the wafer 10.

A variety of factors can influence the selected angle θ. For instance, when a testing port 16 is operated so as to insert light signals into a waveguide 14 as illustrated in FIG. 3A, the angle θ can be selected such that the light signal is refracted in a particular direction for a particular angle α and a particular angle φ. For instance, the angle θ can be selected to produce a degree of refraction that causes the light signal to travel along the waveguide 14 rather than being refracted out of the waveguide 14. For instance, the angle α can be selected such that the light signal is refracted in a direction that is substantially parallel to the longitudinal axis of the waveguide 14 at the facet 30.

Figure 3B:
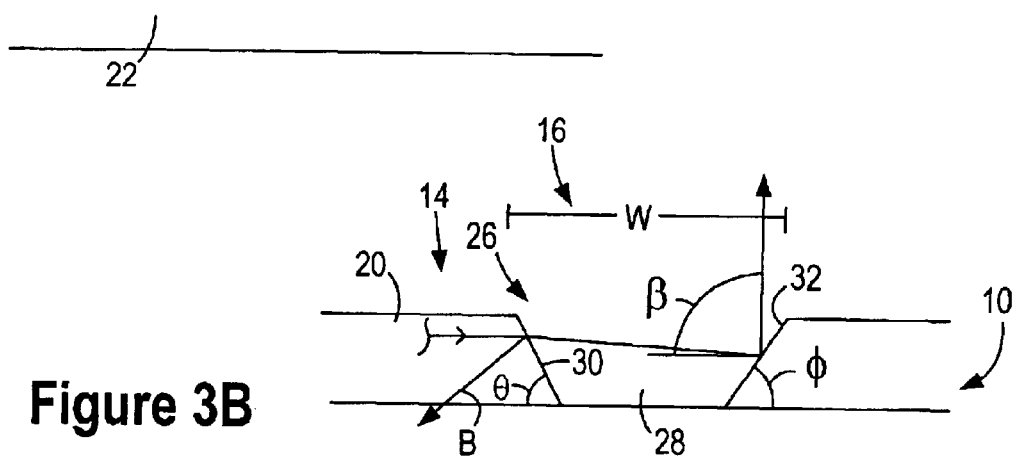
FIG. 3B illustrates the relationships between a facet and a reflecting surface of a testing port constructed to extract a light signal from a waveguide.

When a testing port 16 is operated so as to extract a light signal from a waveguide 14 as illustrated in FIG. 3B, the angle φ can be selected such that a light signal is reflected away from the optical device 12. The light signal is reflected away from the optical device 12 at an angle β measured relative to the base 22. The angle φ can be selected so as to reflect the light signal away from the optical device 12 at a particular angle β. Suitable angles β include, but are not limited to, angles greater than 15°, 30°, 45°, 60° or 70° and angles in the range of 10° to 170°, 30° to 150°, 65° to 115° or 70° to 80°.

In some instances, an angle β approaching 90° is desired. When β approaches 90°, the width of the recess 26 can be reduced because the opportunity for interference between the light signal and the side of the recess 26 having the facet 30 is reduced. The reduction in the width of the recess 26, W, results in a reduction in the amount of space occupied by the testing port 16 on the wafer 10.

A variety of factors can influence the selected angle θ. For instance, when a testing port 16 is operated so as to extract light signals from a waveguide 14 as illustrated in FIG. 3B, the angle θ can be selected such that the portion of the light signal that is reflected by the facet 30 is reflected out of the waveguide 14 as illustrated by the line labeled B. Suitable ranges for the angle θ when reflecting the reflected portion of the light signal out of the waveguide 14 include, but are not limited to, angles in the range from 0° to 90°, 45° to 90°, 50° to 60° and 52° to 57°. When a testing port 16 is operated so as to insert light signals into a waveguide 14 as illustrated in FIG. 2D, the angle θ can be selected such that the light signal is refracted at an angle that causes the light signal to travel along the waveguide 14 rather than being refracted at an angle that causes the light signal to be directed out of the waveguide 14. For instance, the angle θ can be selected such that the light signal is refracted in a direction that is substantially parallel to the longitudinal axis of the waveguide 14 at the facet 30. As a result, the light signal is refracted at an angle that causes the light signal to travel along the waveguide 14 in a direction that is substantially parallel to the direction of propagation of the light signals along the waveguide 14 at the facet 30. Suitable ranges for the angle θ when refracting the light signal in a desired direction include, but are not limited to, 0° to 90°, 45° to 90°, 50° to 60° and 52° to 57°.

Figure 3C:
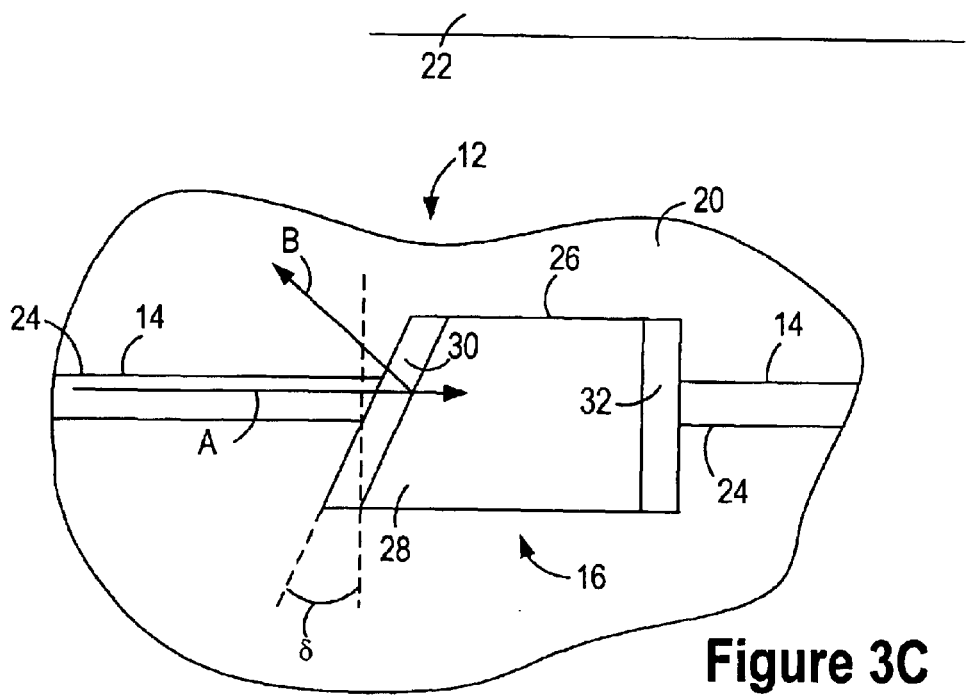
FIG. 3C illustrates a facet positioned on of a waveguide. The facet is angled such that the reflected portion of a light signal being transmitted through the facet is reflected out of the waveguide.

In some instances, the facet 30 is angled so as to direct reflected portions of the tapped light signal out of the waveguide 14. For instance, FIG. 3C is a topview of a testing port 16. The facet 30 is positioned at an angle δ measured relative to a plane that is perpendicular to the base 22 and perpendicular to the longitudinal axis of the waveguide 14 at the facet 30. Accordingly, in some instances, the facet 30 can be positioned at an angle θ measured relative to the base 22 and at an angle δ measured relative to a plane perpendicular to the base 22. When the testing port 16 is operated so as to extract a light signal from the waveguide 14, a portion of the light signal is transmitted through the facet 30 and a portion of the light signal is reflected by the facet 30 as illustrated by the arrow labeled A. The angle δ can be selected such that the reflected portion of the light signal is reflected out of the waveguide 14 as illustrated by the arrow labeled B rather than being reflected back into the waveguide 14. The angle δ can be greater than 0° or greater than 1°. Suitable angles for the angle δ include, but are not limited to, angles in the range of 0° to 45°, 1° to 15°, 2° to 9° or 3° to 8°. The choice of the angle δ can be function of the optical component construction. For instance, a suitable angle δ can be different for different combinations of the light transmitting medium and the second light transmitting medium. In some instances, the angle θ will be sufficient to direct the reflected portion out of the waveguide 14 and an angle δ of 0° is suitable.

Although forming the facet at an angle δ greater than 0° is disclosed in the context of a testing port operated so as to extract a light signal from a waveguide, there are also advantages associated with positioning the facet at an angle δ greater than 0° when the testing port is operated to insert a light signal into the waveguide. For instance, the angle δ can be selected such that the portion of the light signal reflected by the facet does not return to the light source. In some instances, the angle θ will be sufficient to prevent the light signal from returning to the light source and an angle δ of 0° is suitable.

Figure 4:
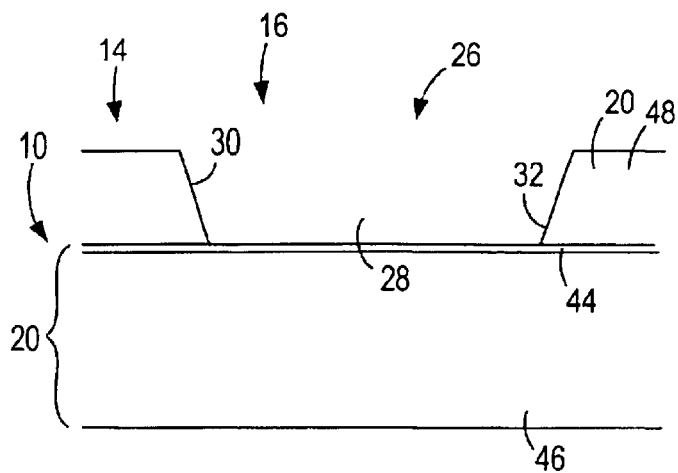
FIG. 4 illustrates an example of a testing port constructed on a silicon-on-insulator wafer.

FIG. 4 provides a particular example of a testing port 16 constructed on a silicon-on-insulator wafer. A silicon-on-insulator wafer typically includes a silica layer 44 between silicon layers 46. One silicon layer 46 serves as the light transmitting medium 20. The base 22 includes the silica layer 44 positioned on the other silicon layer 46. Accordingly, the other silicon layer 46 serves as a silicon substrate. The second light transmitting medium 28 is air. The angle φ is about 54.7° and the θ is about 54.7°.

Figure 5:
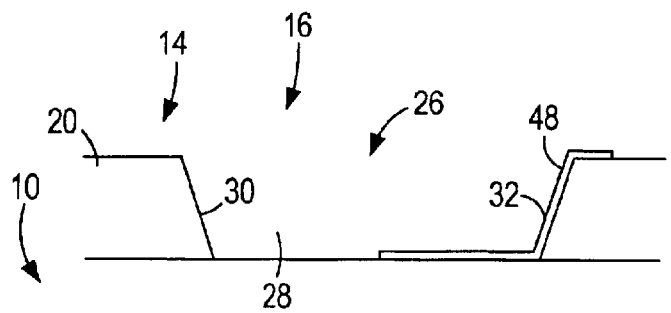
FIG. 5 illustrates a reflective layer formed in the recess of a testing port. The reflecting layer serves as a reflecting surface configured to exchange light signals with a facet.

A reflective layer 48 can be employed to form the reflecting surface 32 as shown in FIG. 5. Suitable reflective layers 48 include, but are not limited, an aluminum layer. The reflective layer 48 can reduce and/or eliminate the portion of the light signal that is transmitted through the reflecting surface 32. The reflective layer 48 can allow for a broader range of possible φ angles because there is no need to select φ so as to provide an acceptable ratio of reflection to transmission at the reflecting surface 32.

Figure 6:
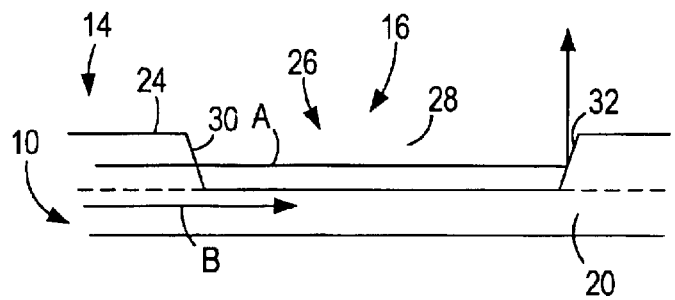
FIG. 6 illustrates an optical device having a light transmitting medium positioned on a base. The recess of a testing port extends part way into the light transmitting medium.

Although the recess 26 of the testing ports 16 shown above extends through the light transmitting medium 20 to the base 22, the recess 26 can extend part way through the light transmitting medium 20 as shown in FIG. 6. The dashed line in FIG. 6 illustrates the location of the base of the ridge 24. The recess 26 extends to the base of the ridge 24. This structure has an advantage that the recess can be formed with the same etch that is employed to form the ridge of the waveguide.

When the testing port 16 of FIG. 6 is operated so as to extract a light signal from the optical device 12, only a portion of the light signal will be extracted as illustrated by the arrow labeled A and the arrow labeled B. The arrow labeled A illustrates a portion of the light signal extracted from the waveguide 14 while the arrow labeled B illustrates a portion of the light signal that is not extracted from the waveguide 14. When the testing port 16 of FIG. 6 is operated so as to insert a light signal into the optical device 12, the portion of the light signal that is inserted into the optical device 12 will be a function of the spot size on the facet 30. Accordingly, reducing the cross sectional area of the light signal at the facet 30 will allow an increased portion of the light signal to be inserted into the optical device 12.

Figure 7:
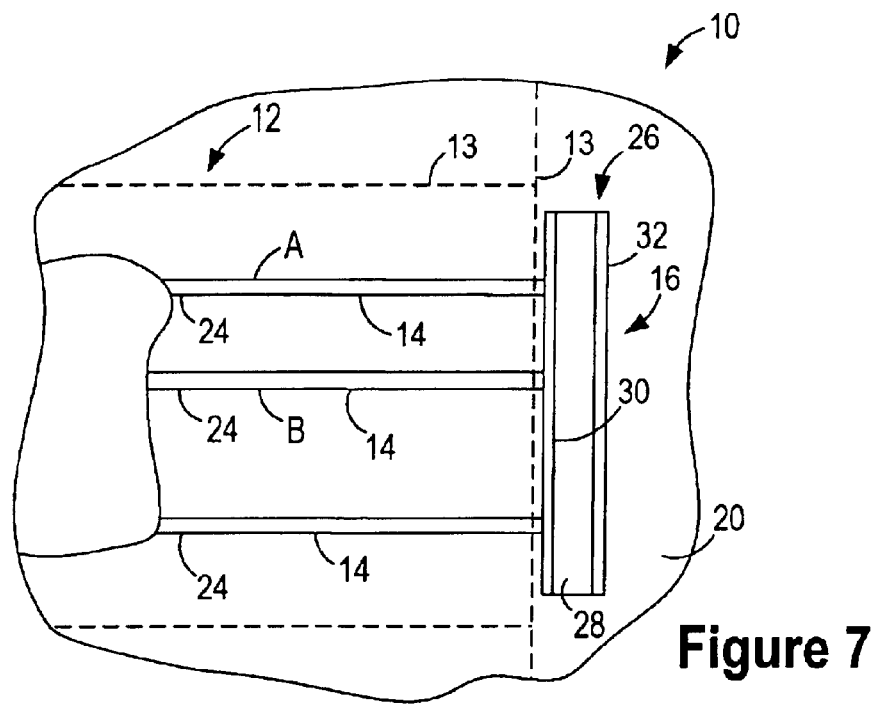
FIG. 7 illustrates an optical device having a testing port associated with a plurality of waveguides.

A testing port 16 can be associated with more than one waveguide 14 as illustrated in FIG. 7. FIG. 7 is a top view of a portion of a wafer having a testing port 16 that is common to a plurality of waveguides 14. The testing port 16 includes a plurality of facets that are each positioned at the end of a waveguide 14. The reflecting surface is positioned opposite the facet of each waveguide. Different portions of the testing port 16 can be operated differently. For instance, the portion of the testing port 16 associated with the waveguide 14 labeled A can be operated so as to insert a light signal into the waveguide 14 labeled A while the portion of the testing port 16 associated with the waveguide 14 labeled B can be operated so as to extract a light signal from the waveguide 14 labeled B. Although the testing port is shown as being located within the perimeter of a single optical device, the testing port can extend across the perimeter between adjacent optical devices and can serve as a testing port for the waveguide associated with more than one optical component.

Figure 8A:
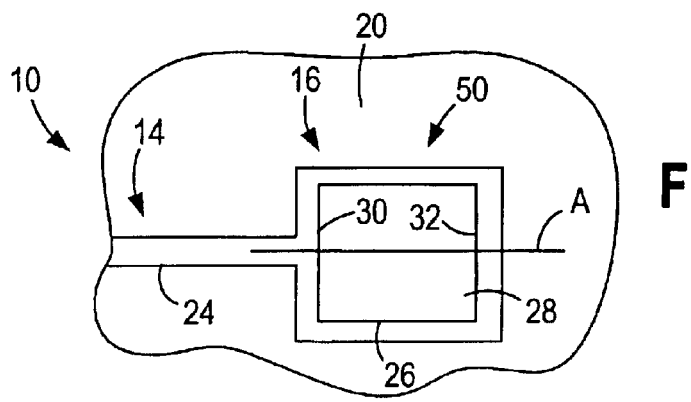
FIG. 8A is a topview of an optical device having a testing port formed in a pad incorporated into a waveguide.
Figure 8B:
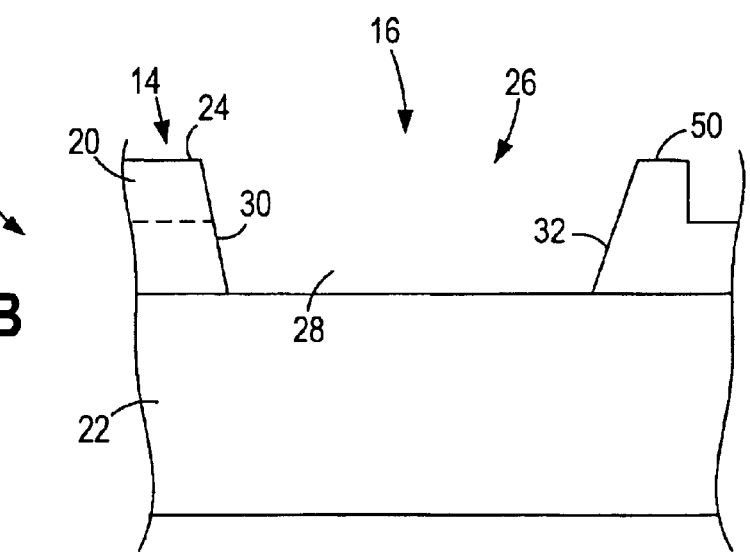
FIG. 8B is a topview of an optical device having a testing port formed in a pad incorporated into a waveguide.

The waveguide 14 can include a pad 50 that includes the testing port as shown in FIG. 8A and FIG. 8B. FIG. 8A is a topview of a testing port 16 and FIG. 8B is a cross section of the testing port 16 taken at the line labeled A in FIG. 8A. The dashed line illustrates the location of the base of the ridge 24 in FIG. 8B. The waveguide 14 ends at the pad 50 and the recess 26 is formed in the pad 50. When the testing port 16 is configured to extract a light signal from a waveguide 14, a light sensor such as a photodetector can optionally be positioned over the pad 50 so as to receive the light signals from the reflecting surface 32. In some instances, the light sensor is immobilized on the pad 50 employing an adhesive such as epoxy.

Figure 9A:
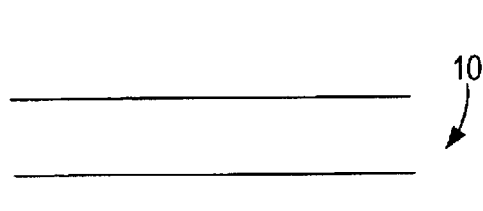
FIG. 9A through FIG. 9L illustrate a method of forming a testing port.

FIG. 9A through FIG. 9L illustrate a method of forming a testing port 16 on an optical device 12. FIG. 9A is a cross section of a wafer 10 having a light transmitting medium 20 positioned on a base 22. A suitable wafer 10 includes, but is not limited to, a silicon-on-insulator wafer.

Figure 9B:
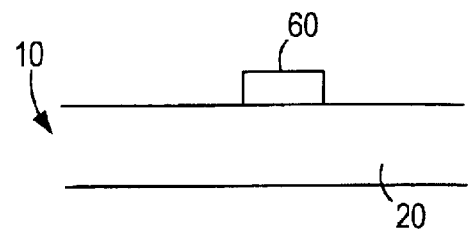

A first mask 60 is formed on the wafer 10 so as to provide the wafer 10 illustrated in FIG. 9B. The mask is positioned so as to protect regions where the ridge 24 of a waveguide 14 is to be formed. A suitable first mask 60 includes, but is not limited to, a photoresist, a metal layer, nitride or oxide.

Figure 9C:
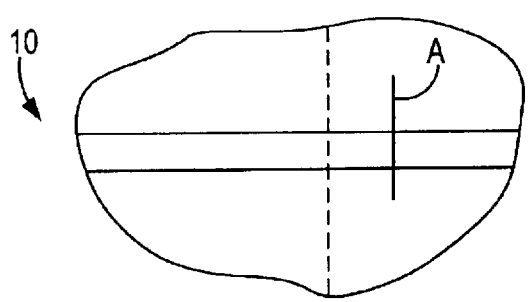
Figure 9D:
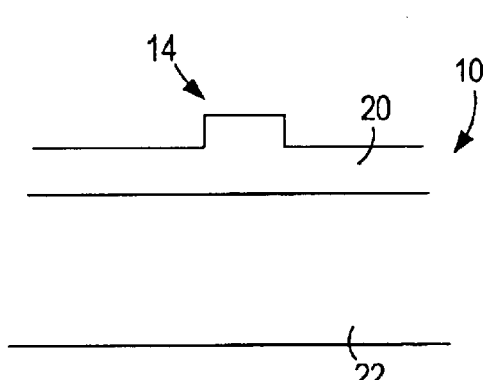

A first etch is performed and the mask removed so as to provide the wafer 10 illustrated in FIG. 9C and FIG. 9D. FIG. 9C is a topview of the wafer 10 and FIG. 9D is a cross section of the wafer 10 shown in FIG. 9C taken at the line labeled A. The sides of the ridge 24 are formed by the first etch. Because the ridge 24 defines a portion of the light signal carrying region, the first etch should be selected to provide a smooth sides so as to reduce scattering and reflection.

Figure 9E:
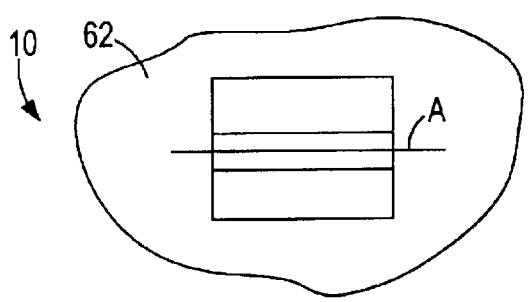
Figure 9F:
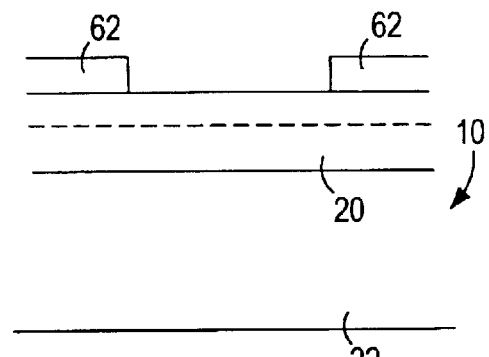

A second mask 62 is formed on the wafer 10 to provide the optical component illustrated in FIG. 9E and FIG. 9F. FIG. 9E is a topview of the wafer 10 and FIG. 9F is a cross section of the wafer 10 taken at the line labeled A in FIG. 9E. The second mask 62 is formed on the wafer 10 such that the region around where the recess 26 is to be formed are protected while the region where the recess 26 is to be formed remains exposed. A suitable second mask 62 includes, but is not limited to, a photoresist, a metal layer, nitride or oxide.

Figure 9G:
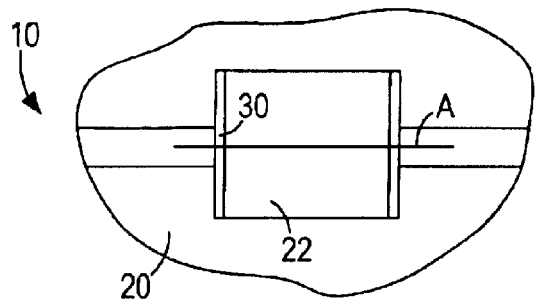
Figure 9H:
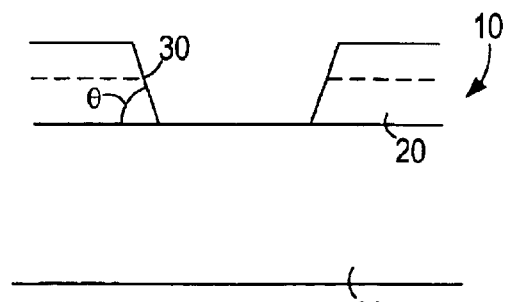

A second etch is performed and the second mask 62 removed so as to provide the wafer 10 illustrated in FIG. 9G and FIG. 9H. FIG. 9G is a topview of the wafer 10 and FIG. 9H is a cross section of the wafer 10 taken at the line labeled A in FIG. 9G. The facet 30 is formed by the second etch. As a result, the second etch must be conducted so as to form the facet 30 at the desired angle $\theta$. A suitable second etch includes, but is not limited to, a dry etch or a plasma etch. The angle $\theta$ that results from a dry etch can often be selected by changing the ratio of the components in the dry etch or the plasma etch.

Figure 9I:
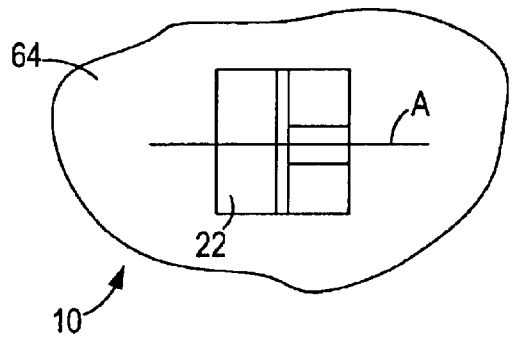
Figure 9J:
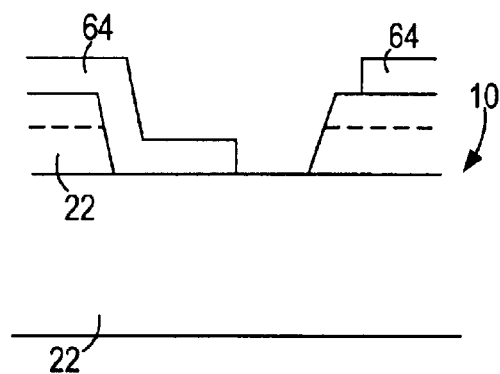

A third mask 64 is formed on the wafer 10 to provide the optical component illustrated in FIG. 9I and FIG. 9J. FIG. 9I is a topview of the wafer 10 and FIG. 9J is a cross section of the wafer 10 taken at the line labeled A in FIG. 9I. The third mask 64 is formed on the wafer 10 such that the side of the recess 26 where the reflecting surface 32 is to be formed remains exposed. A suitable third mask 64 includes, but is not limited to, a photoresist, a metal layer, nitride or oxide.

Figure 9K:
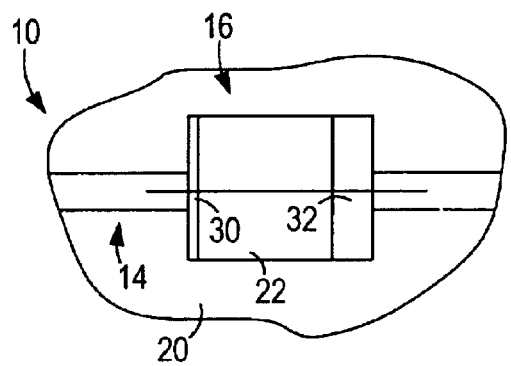
Figure 9L:
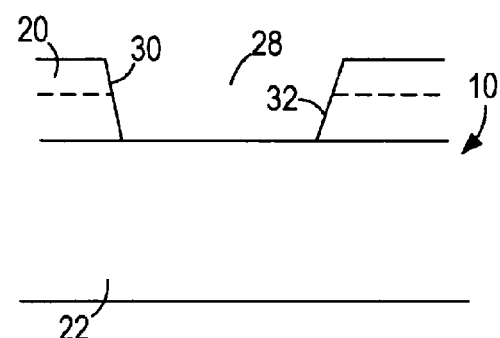

A third etch is performed and the third mask 64 removed so as to provide the wafer 10 illustrated in FIG. 9K and FIG. 9L. FIG. 9K is a topview of the wafer 10 and FIG. 9L is a cross section of the wafer 10 taken at the line labeled A in FIG. 9K. The reflecting surface 32 is formed by the third etch. As a result, the third etch must be conducted so as to form the facet 30 at the desired angle $\phi$. When the light transmitting medium 20 is silicon, a suitable third etch includes, but is not limited to, a wet etch. The wet etch will cause the reflecting surface 32 to be formed at an angle $\phi$ of about 54.7° due to the crystalline nature of the silicon.

When it is desired to employ a reflective layer 48 as the reflecting surface 32. The reflecting layer can be formed after the third etch and before the third mask 64 is removed. A suitable method for forming a metal reflecting layer includes, but is not limited to, evaporation, sputtering and plating. As noted above, the angle $\phi$ and the angle $\theta$ can be the same in some instances. In these instances, the method illustrated in FIG. 9A through FIG. 9L can be stopped after performance. However, when the angle $\phi$ and the angle $\theta$ are to be the same and the reflective layer 48 is desired, the third mask 64 can be employed to form the reflective layer 48 at the desired location.

As noted above, in some instances, the recess 26 includes a second light transmitting medium 28 other than air. To form the second light transmitting medium 28 in the recess 26, a fourth mask (not shown) is formed on the wafer such that the recess 26 remains exposed, the second light transmitting medium 28 is formed in the recess 26 and the fourth mask removed. Suitable methods for forming the second light transmitting medium 28 in the recess 26 include, but are not limited to, growing the second light transmitting medium 28 in the recess 26 or depositing the second light transmitting medium 28 in the recess 26.

Although each of the waveguides 14 shown above include a testing port 16, in some instances, only a portion of the waveguides 14 will include a testing port 16.

Although the reflecting surface 32 is illustrated above as being on an opposite side of the recess 26 from the facet 30, the reflecting surface 32 can occupy a different position on the recess 26. For instance, the reflecting surface 32 can be positioned on a bottom of the recess 26 and the facet 30 can be constructed to exchange light signals with the reflecting surface 32. For instance, when the testing port 16 is operated so as to extract a light signal from the waveguide 14, the facet 30 can be constructed so as to refract the light signal toward the bottom of the recess 26.

Although the testing port 16 is disclosed in the context of a single reflecting surface 32 being positioned in the recess 26, the testing port 16 can be constructed with a plurality of reflecting surfaces 32. For instance, the testing port 16 can be constructed so more than one reflection occurs in the recess 26. As an example, both the bottom of the recess and a side of the recess 26 can serve as a reflecting surface 32. As a result, all or a portion of the light signal will be reflected off both the bottom and the side of the recess 26 during operation of the testing port 16.

Although FIG. 1 illustrates the testing ports 16 positioned outside of the line of separation so the testing ports 16 are removed from the optical device 12 upon separation of the optical devices 12, the testing ports 16 can be positioned within the lines of separation associated with an optical device 12 and or within the perimeter 13 of an optical device. Accordingly, the testing ports 16 will remain intact on the optical device 12 when the optical device 12 is separated.

Although the optical component is disclosed in the context of optical components having ridge waveguides, the principles of the present invention can be applied to optical devices having other waveguide types. Suitable waveguide types include, but are not limited to, buried channel waveguides and strip waveguide.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

What is claimed is:

1. A method, comprising:
   generating a wafer that includes one or more optical devices, at least one of the optical devices having a waveguide extending from within a perimeter of the optical device to a testing port located outside of the perimeter, the testing port being configured to receive a light signal from over the wafer and to insert the light signal into the waveguide or configured to receive the light signal from the waveguide and direct the light signal to a location over the optical device; and
   separating the at least one optical device from a portion of the wafer such that the testing port is separated from the at least one optical device.

2. The method of claim 1, wherein the wafer includes includes a second waveguide extending from within a perimeter of the at least one optical device to a second testing port located on the wafer outside of the perimeter, the second testing port being configured to receive a light signal from over the wafer and to insert the light signal into the second waveguide or to receive the light signal from the second waveguide and direct the light signal to a location over the optical component.

3. The method of claim 2, wherein separating the one or more optical devices from the wafer includes removing the second testing port from the at least one optical device.

4. The method of claim 2, further comprising:
   employing the testing port to insert a light signal into the waveguide before separating the one or more optical devices; and
   employing the second testing port to extract at least a portion of the light signal from the second waveguide.

5. The method of claim 4, wherein inserting the light signal into the waveguide includes directing the light signal to the optical device at an angle α of greater than 15°, the angle α being measured relative to a base of the optic device.

6. The method of claim 4, wherein the light signal is extracted such that the light signal travels from the optical device at an angle β of greater than 15°, the angle β being measured relative to a base of the optical device.

7. The method of claim 4, wherein inserting a light signal into a waveguide includes directing the light signal to a reflecting surface such that the light signal travels from the light signal through a facet of the waveguide.

8. The method of claim 4, wherein extracting a light signal from the second waveguide includes directing the light signal from a facet of the second waveguide to a reflecting surface arranged so as to reflect the light signal to the location over the optical device.

9. The method of claim 1, further comprising:
   employing the testing port to insert the light signal into the waveguide before separating the at least one optical device from the portion of the wafer.

10. The method of claim 1, further comprising:
    employing the testing port to receive the light signal from the waveguide and direct the light signal to the location over the optical device, the light signal being received from the waveguide before separating the at least one optical device from the portion of the wafer.

11. The method of claim 1, wherein the waveguide is positioned on a base and the testing port includes a facet positioned on the waveguide, the facet being angled at an angle δ greater than 0°, the angle δ being measured relative to a plane that is perpendicular to the base and perpendicular to a longitudinal axis of the waveguide at the facet.

12. The method of claim 1, wherein the testing port includes a facet positioned at the end of the waveguide and a reflecting surface spaced apart from the facet.

13. The method of claim 12, wherein the waveguide is defined in a light transmitting medium and the reflecting surface includes a reflective layer positioned on the light transmitting medium.

14. The method of claim 12, wherein the reflective layer includes a metal.

15. The method of claim 12, wherein the reflecting surface is positioned at an angle φ measured relative to a base of the associated optical device, the angle φ being less than 90°.

16. The method of claim 12, wherein the reflecting surface is positioned at an angle φ measured relative to a base of the associated optical device, the angle φ being in a range of 45° to 90°.

17. The method of claim 12, wherein the reflecting surface is positioned at an angle φ measured relative to a base of the associated optical device, the angle φ being in a range of 50° to 60°.

18. The method of claim 1, wherein the testing port includes a facet positioned on the waveguide, the facet being positioned at an angle θ measured relative to a base of the associated optical device, the angle θ being less than 90°.

19. The method of claim 1, wherein the testing port includes a facet positioned on th waveguide, the facet being positioned at an angle θ measured relative to a base of the associated optical device, the angle θ being in a range of 50° to 60°.

20. The method of claim 1, wherein the wafer is a silicon-on-insulator wafer.

21. The method of claim 1, wherein separating the at least one optical device from the portion of the wafer includes etching the wafer so as to separate the at least one optical device from the portion of the wafer.

22. The method of claim 1, wherein the wafer includes a plurality of the optical devices and separating the at least one optical device from the portion of the wafer includes separating the optical devices from one another.

* * * * *